United States Patent [19]
Getz

[11] 3,890,073
[45] June 17, 1975

[54] CENTER MECHANISM FOR A PRESS TO SHAPE AND CURE TIRES

[75] Inventor: Gary R. Getz, Norton, Ohio

[73] Assignee: McNeil Corporation, Akron, Ohio

[22] Filed: Dec. 5, 1973

[21] Appl. No.: 422,027

Related U.S. Application Data

[62] Division of Ser. No. 185,931, Oct. 4, 1971, Pat. No. 3,790,656.

[52] U.S. Cl. .................. 425/48; 425/33; 425/43; 425/58
[51] Int. Cl. ............................................. B29h 5/02
[58] Field of Search ............ 425/31, 33, 43, 51, 52, 425/58, 31, 32, 38, 48, 32

[56] References Cited
UNITED STATES PATENTS

| | | | |
|---|---|---|---|
| 1,760,880 | 6/1930 | Midgley | 425/31 |
| 1,779,376 | 10/1930 | Sivern | 425/31 |
| 1,779,377 | 10/1930 | Sivern | 425/31 |
| 2,763,317 | 9/1956 | Ostling et al. | 425/52 X |
| 2,997,738 | 8/1961 | Soderquist | 425/38 X |
| 3,260,782 | 7/1966 | Soderquist | 425/43 X |
| 3,336,635 | 8/1967 | Soderquist | 425/33 |
| 3,396,221 | 8/1968 | Balle et al. | 425/43 X |
| 3,459,849 | 8/1969 | DeRonde | 425/32 X |
| 3,564,649 | 2/1971 | Soderquist | 425/38 X |
| 3,640,653 | 2/1972 | Laenen et al. | 425/38 X |
| 3,654,025 | 4/1972 | Winger et al. | 425/32 X |

*Primary Examiner*—J. Howard Flint, Jr.
*Attorney, Agent, or Firm*—Hamilton, Renner & Kenner

[57] ABSTRACT

The present invention relates to center mechanisms for presses used in the shaping and curing of tires. The subject center mechanism employs the well known, radially distensible bladder to shape the tire band, but provides bearing plates disposed within the cavity defined by said bladder and movable radially to effect the application of pressure against locations within a predetermined area on the radially inner surface of the uncured tire band — viz., an area intercepted by its transverse plane of structural symmetry — and to support the tire band in spaced relation with respect to the mold sections and/or the bead rings associated therewith while the bladder is inflated progressively and symmetrically within the tire band. This radially outward displacement of the bearing plates assures that the bladder will also be inserted symmetrically within the tire band, and such displacement can be readily effected by a mechanical drive.

11 Claims, 6 Drawing Figures

CENTER MECHANISM FOR A PRESS TO SHAPE AND CURE TIRES

This is a division of application Ser. No. 185,931, filed Oct. 4, 1971 now U.S. Pat. No. 3,790,656, which issued on Feb. 5, 1974.

BACKGROUND OF THE INVENTION

The present inventin relates to presses for shaping and curing tires. Specifically, the present invention relates to a unique center mechanism for such presses.

Although the prior art has seen numerous concepts and developments relating to the construction of presses for shaping and curing tires, except for some comparatively unsuccessful attempts to devise a "bagless" center mechanism, the most universally acceptable center mechanism has employed a flexible, generally cylindrical bladder, or bag, that is secured to the press and is capable of being radially distended within the uncured tire band in order to apply shaping pressure and curing heat against the interior of the tire. The inventor's assignee has pioneered such presses and manufactures the well-known and highly regarded press sold under the registered trademark Bag-O-Matic.

Pneumatic tires are complex structures developed in the face of countless problems. Many of these problems arise from combining several highly dissimilar materials into an integrally functioning article. The typical pneumatic tire is epitomized by its generally horseshoe shaped cross section. The majority of the tire carcass consists of a reinforcing material (such as strands of glass or wire or fabrics woven of cotton, rayon, nylon or polyesters) intermixed with a vulcanized rubber, or equivalent, compound.

Additional wear resistant rubber, or substitutes therefor, form the tread portion which contacts the road, and the radially innermost, or bead, portions of the tire — those correspond to the heels of the horseshoe — contain a stranded wire ring, or grommet, for maintaining that portion of the assemblage virtually inextensible.

Tire carcasses reinforced with only the woven fabric are generally of the bias ply variety, and such tires are made by wrapping plies of the rubber coated fabric onto a tire building drum with the bead grommets suitably positioned and enclosed by the plies. At this stage the future tire looks like an endless, annular belt and is called a tire band.

After the removal from the drum-like tire building machine the tire band must be shaped into its familiar toroidal form and cured. Shaping and curing are commonly accomplished within a press. According to prior art techniques the tire band is loaded into the press with the lowermost bead forming portion of the tire band seated on a bead ring in the press. The bladder extends axially of the annulus delineated by the tire band, and the axial extent of the bladder approximates the axial extent of the tire band. Because of this conformity between the axial extent of the bladder and the tire band, inflation of the bladder radially distends it within the axial confines of the tire band. As the bladder is further distended radially it has been customary to bring a separate bead ring into engagement with the uppermost bead forming portion of the tire band and urge the two bead forming portions axially toward each other by virtue of the pressure applied thereto by the two bead rings. This simultaneous application of compressive forces against the opposite bead forming portions in conjunction with the radial distention of the bladder shapes the cylindrical tire band into the more familiar toroidal form defined by the interior surfaces of the opposed mold sections that close about and encase the toroidally shaped tire band during the application of the heat which effects the cure. The inflated bladder asserts continued pressure against the interior of the shaped tire band to maintain it in intimate contact with the interior surfaces of the opposed mold sections during the full curing cycle.

Bias ply tires are almost universally cured in twopiece molds — that is, in molds which comprise two pieces with their parting line lying in a plane oriented transversely of what will be the rotational axis of the finished tire.

Radial ply tires have alreadly met with considerable success abroad and are gaining continually increased favor domestically. Radial ply tires as well as the belted/bias ply tire both incorporate an annular, inextensible breaker ply, or belt, that extends circumferentially of the tire carcass beneath the tread rubber. Such tires can not be shaped from a cylindrical tire band because of the inextensible nature of the breaker ply employed in such a tire. Rather, the carcass must be at least partially preshaped before the breaker ply is positioned. In preshaped tire bands the bead forming portions are in closer axial proximity to each other and the radial dimension of the preshaped tire band approximates that of the cured tire.

Primarily because of these distinctions in the cross-sectional configurations of the uncured tire bands, presses adapted to shape and cure bias ply tires have not heretofore been successfully adapted to complete the shaping of, and then cure, radial tires without making at least two major structural changes to the press.

First, it has been required to substitute the expensive segmented mold for the relatively less complicated and less expensive two-piece mold. Second, complicated guide mechanisms have been required to assure that the bladder would inflate fully within the partially preshaped tire band without doing irreparable damage to the bead forming portion thereof. It must be appreciated that the bead forming portions of an uncured tire band are highly susceptible to mishandling, and anything which causes the bead wire to kink or to separate from the rubber and reinforcing material of the carcass with which it is surrounded results in irreparable damage to the resulting tire. Kinking of the bead, for example, can result in localizing the stresses to which the bead is subjected and even itself result in separation of the grommet from the fabric. Localization of the stresses actually crystallizes the wire so that failure may result at that point. Separation may cause failure of the bead by permitting corrosion, but even more insidiously dangerous, a bead grommet that has separated from the surrounding fabric will generate sufficient heat to char and completely destroy the fabric. Sliding engagement of the bladder against the bead forming portion of the uncured tire band during inflation of the bladder can occasion such damage to the tire band.

As previously noted, it has heretofore also been the custom to support the uncured tire band on a bead ring as the bladder is inflated to shape the tire band. Because efficient operation requires rapid recycling of the press, the uncured tire band is loaded in the press only moments after a cured tire is stripped therefrom — and before the mold and bead rings have cooled. As such, any delay between the time that an uncured tire band first makes contact with the hot bead ring and the completion of the shaping operation can result in premature initiation of the curing operation to that bead forming portion of the tire band. Premature initiation of the cure to either bead forming portion of the tire band can impede the necessary adjustment and reorientation that occurs between the plies and the bead grommet as the tire is shaped to its final toroidal form. Flaws of this nature can not generally be detected by visual inspection, but they constitute a potential hazard in that they tend to induce premature tire failure through stress localization or ply separation.

The operation of the center mechanism in most prior art presses is accomplished by hydraulic means. That is, the axial extension of the bladder necessary to permit removal of a cured tire is normally effected by the application of axially directed separating forces to the opposite ends of the bladder, and these separating forces are generally applied by a hydraulic cylinder. Inasmuch as water is chemically neutral to the exposed components of a tire as well as the material (usually rubber) from which the bladder is made, it is often employed as the hydraulic fluid. Using water as the hydraulic fluid works quite well and is most satisfactory so long as the seal between the piston rod and the cylinder effectively precludes any leakage. However, if water does escape into the bladder from such hydraulic devices while the bladder is axially extended to allow removal of the cured tire, the residual heat from the previous curing cycle causes the liquid water to flash into steam, and this steam tends to inflate the bladder. When a sufficient quantity of water leaks into the bladder, the bladder will "puff" radially outwardly beyond the diameter circumscribed by the beads of the cured tire and thereby impede removal of the tire from the press.

SUMMARY OF THE INVENTION

It is, therefore, a primary object of the present invention to provide a center mechanism which permits a press for shaping and curing tires to be as readily adapted to receive, finish shaping and cure partially preshaped tire bands as it is to receive, shape and cure cylindridal tire bands.

It is another object of the present invention to provide a center mechanism, as above, which may be used in conjunction with either two-piece or segmented molds and which permits a partly preformed tire band, such as that from which a radial tire is made, to be cured in a standard two-piece mold of the type heretofore employed only to cure bias ply tires.

It is still another object of the present invention to provide a center mechanism, as above, which employs a bladder to shape the tire band but which assures that the bladder can be distended radially within even a partially preshaped tire band without damaging the bead forming portions thereof.

It is yet another object of the present invention to provide a center mechanism, as above, which mechanically supports the tire band out of contact with the mold sections and/or bead rings in order to preclude premature initiation of the curing operation caused by such contact.

It is a further object of the present invention to provide a center mechanism, as above, which mechanically centers the tire band concentrically of the bladder and induces progressive contact between the bladder and the tire band from its transverse plane of structural symmetry toward each of its bead forming portions in order to preclude air entrapment between the bladder and the tire band and to assure that inflation of the bladder itself will not induce molding stresses in the tire band.

It is a still further object of the present invention to provide a center mechanism, as above, which is adapted to employ the standard prior art bladder forms, which accommodates the prior known quick change mechanism for securing bladders thereto, which induces increased bladder life and which requires less critical dimensional standards for the bladder.

These and other objects, together with the advantages thereof over existing and prior art forms which will become apparent from the following specification, are accomplished by means hereinafter described and claimed.

In general, a center mechanism embodying the concept of the present invention employs bearing plates disposed within the cavity defined by a flexible bladder and supported on the link arms which effect radial displacement of the bearing plates. An uncured tire band is positioned over the axially extended bladder with the transverse plane of structural symmetry of the tire band being particularly located with respect to the path along which the bearing plates travel during radial displacement thereof. Specifically, the tire band is positioned such that the bearing plates will drive the medial section of the bladder into firm engagement with the tire band at locations through which its plane of structural symmetry passes. The bearing plates thereby effect the application of mechanical pressure against the uncured tire band and support it in a predetermined position with respect to the bladder.

In the preferred embodiment the link arms which support the bearing plates are secured to opposed hubs movable axially toward and away from each other by a mechanical drive. A pair of racks — one secured to each hub — driven in opposite directions by a common pinion may serve as the mechanical drive and work quite well for this purpose.

In operating apparatus according to the present invention an uncured tire band is loaded into a press employing the subject center mechanism by first positioning the band generally concentrically of the center mechanism and in spaced relation with respect to the mold sections and bead rings of the press. Thereafter, supporting engagement of the tire is effected by mechanical means presented from the center mechanism — specifically, the bearing plates disposed within the bladder — which apply radially outwardly directed pressure against the tire band. With the tire band so supported, the bladder is inflated to distend radially and engage the tire band progressively from its plane of structural symmetry toward each of the opposed bead forming portions, thereby precluding the entrapment of air between the bladder and the tire band and eliminating the inducement of molding stresses in the tire band which can occur by asymmetric inflation. One, or both, of the bead rings are brought into contact with the bead forming portions of the tire band and in sequence, or, if desired, simultaneously, the mold sections are closed to encase the outer surface of the shaped tire for curing.

One preferred embodiment of the center mechanism incorporating the concept of the present invention and capable of operating according to the method thereof, is depicted in conjunction with two alternative forms of a loading mechanism and shown by way of example in the accompanying drawings and described in detail without attempting to show all of the various forms and modifications in which the invention might be embodied; the invention being measured by the appended claims and not by the details of the specification.

DESCRIPTION OF THE PREFERRED EMBODIMENTS

Although a center mechanism according to the concept of the present invention, as designated generally by the numeral 10, may be incorporated in various types and constructions of a press to shape and cure tires, a press of the general type disclosed in prior U.S. Pat. No. 3,336,635 and the references therein constitutes one example of a suitable press structure.

Figure 1:
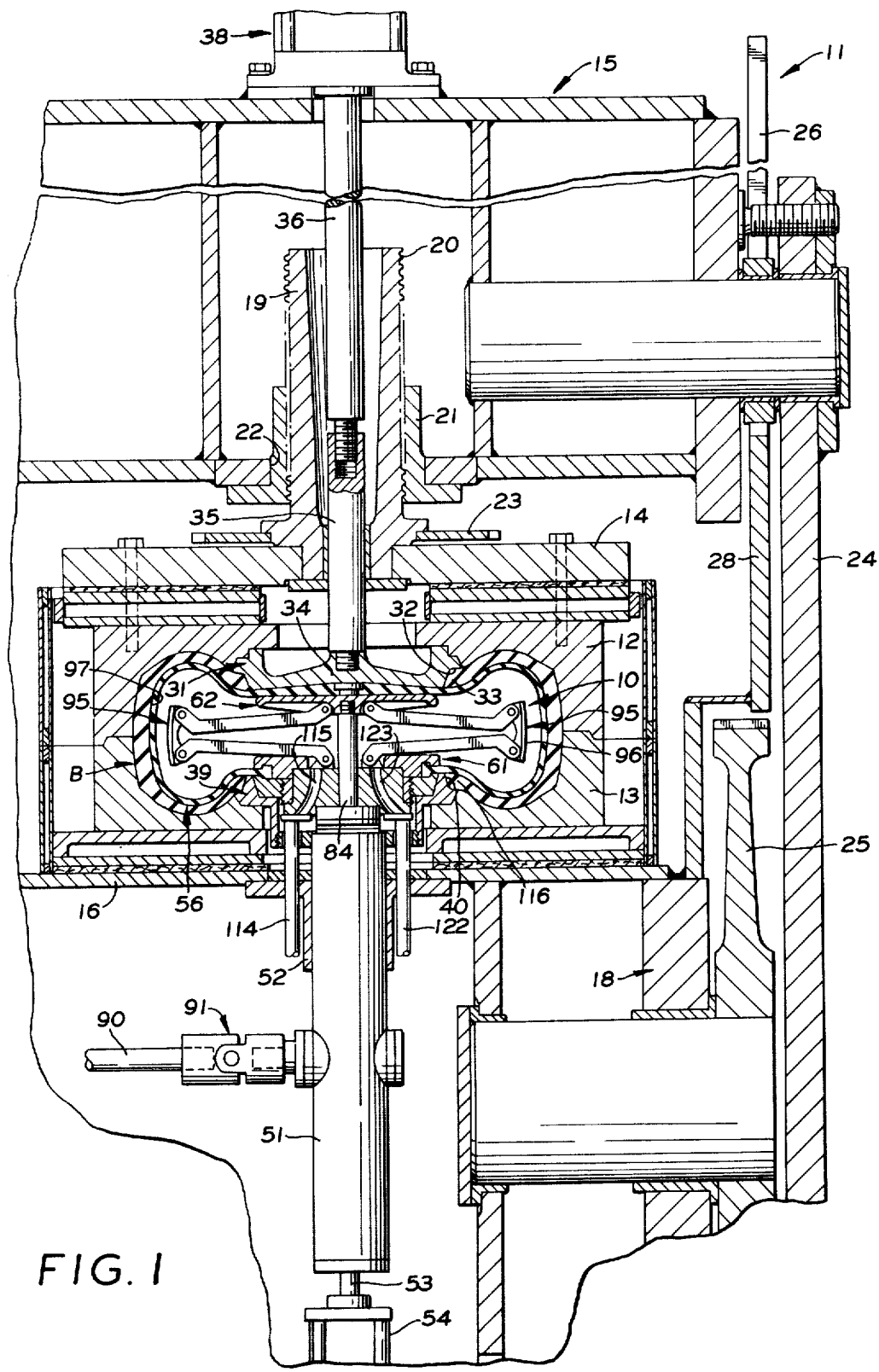
FIG. 1 is a vertical cross section depicting a portion of a press for shaping and curing tires in the closed position and equipped with a center mechanism embodying the concept of the present invention and capable of performing the method herein disclosed.

Referring more particularly to FIG. 1, herein, a portion of a suitable press 11 is shown, and the press 11 is depicted as mounting separable upper and lower, mating mold sections 12 and 13, respectively. The center mechanism 10 is equally suitable for use in a press mounting the more complex segmented mold sections, but inasmuch as the subject center mechanism largely obviates the need for segmented molds they are not depicted.

The upper mold section 12 is carried by an upper bolster 14 supported from a cross beam 15 in a manner well known to the prior art. Similarly, the lower mold section 13 is secured to a lower bolster 16 supported on the base portion 18 of the press 11.

The cross beam 15 is connected to the upper bolster 14 by an adjusting sleeve 19. Specifically, the bolster 14 is carried on the lower extremity of the adjusting sleeve 19, and the exterior of the sleeve has threads 20 which engage an internally threaded collar 21 which extends through, and is nonrotatably secured to, a bore 22 in the cross arm 15. Suitable adjusting means such as a ring gear 23 attached to the adjusting sleeve 19 may be provided to move the upper bolster 14 relative to the cross beam 15 in order to accommodate mole sections of different thicknesses.

The cross beam 15 carrying the upper bolster 14 is movable relative to the lower bolster 16 and associated components by an appropriate drive mechanism. In general, the cross beam 15 is pivotally attached to the upper end of operating links 24 disposed on opposite sides of the press 11 (only one side being depicted). The links 24 are also pivotally attached to and are actuated by motor driven bull gears 25 to move the cross beam 15 along a controlled path delineated by guideway 26 presented in guide plates 28 on the sides of the press. The structural details of such a press drive mechanism, and the operation thereof are shown in detail in the above-mentioned U.S. Pat. No. 3,336,635 — particularly with respect to the discussion directed to elements 20–42, therein — and reference is made thereto for such additional detail as might be required. It should also be appreciated that the description herein is directed to one side of a dual press as the preferred embodiment, although the principles of the subject invention would be equally applicable to a single mold cavity press.

The center mechanism 10 depicted herein may include an upper bead ring 31 located centrally of the upper mold section 12 and which for some installations may be movable independently of the upper mold section 12. The upper bead ring 31 comprises a circular plate, the circumference of which presents a circular seat 32 for the uppermost bead forming portion 33 on the uncured tire band (B). When independent movement is desired, the nave, or central portion, 34 of the upper bead ring 31 can be secured to a stem 35 that extends axially through the upper mold section 12 and is slidingly received for reciprocation within the adjusting sleeve 19. Reciprocation of the stem 35, and thus translation of the upper bead ring 31 with respect to the upper mold section 12, is independently accomplished by means of a piston rod 36 adjustably connected to the stem 35 and actuated by a cylinder 38 mounted on the cross beam 15, or, if desired, on the adjusting sleeve 19.

The center mechanism 10 depicted herein also includes a lower bead ring 39 located centrally of the lower mold section 13 and movable with respect thereto. The lower bead ring 39 presents an annular seat 40 on a radial flange 41 disposed in axially spaced relation to the nave 42 of the lower bead ring 39 by a cylindrical, spacing web portion 43. A pair of parallel piston rods 44 and 45 (FIG. 5) are secured to the nave 42 and are axially translated by a pair of corresponding pistons 46 and 48 slidably housed within cylinders 49 and 50, respectively, that are secured to the lower bolster 16 and disposed radially outwardly of a hollow, cylindrical drive guide 51.

Figure 6:
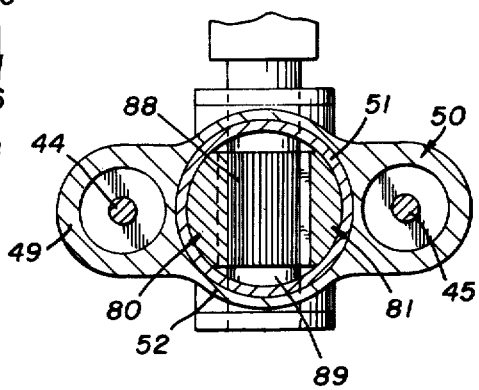

The drive guide 51 is slidingly received for reciprocation within the casing 52 (FIG. 6) that conjoins the cylinders 49 and 50. Reciprocation of the drive guide 51 is accomplished independently of either the lower mold section 13 or the lower bead ring 39 by means of a piston rod 53 connected to the lowermost end of the drive guide 51 and actuated by a cylinder 54 (FIG. 2) mounted on the base portion 18 of press 11.

In addition, the center mechanism 10 employs a flexible bladder, or bag, 56, and while this may well be of the type open at both ends, such as shown in U.S. Pat.

No. 2,699,572, owned by the inventor's assignee, certain advantages — primary among which is the rapidity with which worn bladders can be replaced — are attributable to bladders open only at the lower end and having the general form of a cylindrical cap, such as shown in U.S. Pat. No. 3,298,066 also owned by the inventor's assignee. Radial distention of the bladder 56 is accomplished by inflation, as will hereinafter be more fully explained in conjunction with the operation of the center mechanism. Axial extension of the bladder, however, is accomplished by a mechanical drive indicated generally by the numeral 60 in FIG. 5.

Specifically, the ends of the bladder are selectively movable axially away from each other by a pair of hubs 61 and 62. When employing the closed end type bladder as depicted in the drawings, the open end thereof may be secured to one of the hubs in a way that has heretofore been widely employed because it facilitates rapid replacement. As can best be seen in FIG. 5, the open end of the bladder 56 terminates in an annular, bulbous nodule 63. The nodule 63 is receivable within an annular notch 64 on the lower side of a flange 65 that extends radially outwardly from the body portion 66 of hub 61. An annular clamping ring 68 is provided to secure the nodule 63 within the notch 64.

In order to facilitate the rapidity with which the bladder 56 may be replaced, a lock collar 69 is rotatably received within a circumferential recess 70 in the body portion 66 of the hub 61. The outer surface of the lock collar 69 presents helical threads 71 which matingly engage corresponding threads 72 on the radially inner surface of the clamping ring 68 so that selectively directional rotation of the lock collar 69 moves the ring 68 either into or out of clamping engagement with the nodule 63 received in notch 64. Rotation of the lock collar 69 is readily achieved by rotatably mounting a spur gear 73 within the body portion 66 of the hub 61 and having it meshingly engage corresponding gear teeth 74 on the radially inner surface of the lock collar 69. The resulting epicyclic gear train receives its driving force from that applied to the stud portion 75 of shaft 76 journaled in the hub 61 and to which the spur gear 73 is non-rotatably secured.

The cap-like cavity 77 presented within the lower bead ring 39 and radially bounded by the flange 41 and the spacing web portion 43 provides a recess into which the lower hub 61 can be received in order that the bladder 56 can be positioned to cooperate with the lower bead ring 39 in order to confine the lower bead forming portion 116 of an uncured tire band therebetween when the mold is closed, as shown in FIG. 1.

In the event that a bladder open at both ends were to be employed, a means for securing the other end thereof to the opposite hub 62 would also be required, and a connection similar to that disclosed with respect to hub 61 could well be employed. However, when employing a bladder open only at one end, such as bladder 56 depicted in the drawings, the hub 62 need only be in the form of a circular disc. To assure that the proper disposition of the closed end portion 78 (FIG. 2) of the bladder 56 is maintained with respect to the hub 62 it is advisable to secure the end portion 78 to the hub 62 by means of a cap screw 79.

Figure 5:
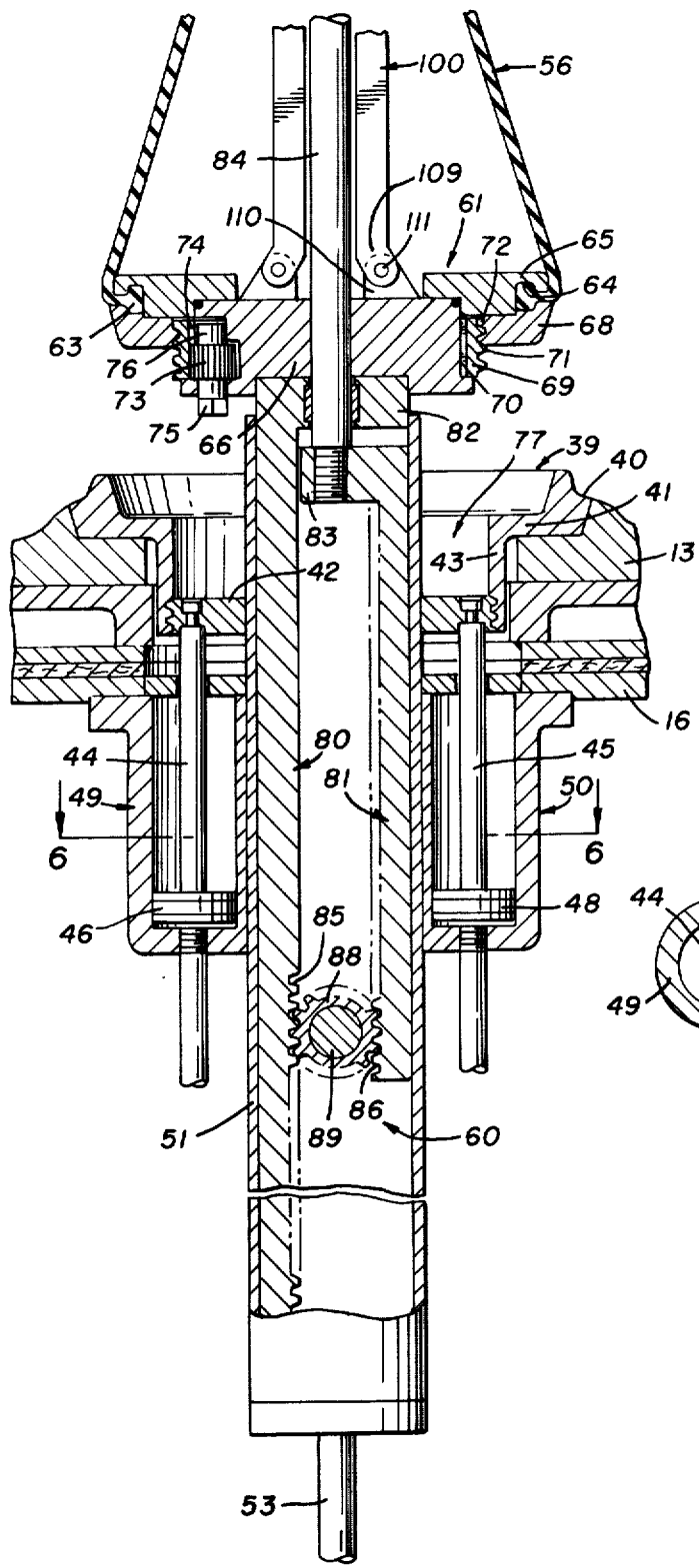
FIG. 5 is an enlarged, transverse, vertical cross section taken substantially on line 5—5 of FIG. 2; and, FIG. 6 is a horizontal cross section taken substantially on line 6—6 of FIG. 5.

The mechanical drive 60 also provides the means for effecting simultaneous axial movement of the hubs 61 and 62 toward and away from each other, and this may readily be accomplished by individual racks 80 and 81 received for reciprocation within the hollow, cylindrical drive guide 51. As best seen in FIG. 5, the rack 80 has a foot portion 82 that is secured to the body portion 66 of the lowermost hub 61 so that the hub 61 is always movable with the rack 80.

The rack 81 is also provided with a foot portion 83, and the lower end portion of a connecting shaft 84 is secured to the foot portion 83. The shaft 84 extends axially through, and is slidably received within, the foot portion 82 on rack 80 as well as the body portion 66 of hub 61. The upper end portion of the shaft 84 is secured to and supports the hub 62 so that the hub 62 is always movable with the rack 81.

The teeth 85 and 86 on the respective racks 80 and 81 face each other in diametric opposition and meshingly engage a common pinion 88. The pinion 88 is nonrotatably secured to a support shaft 89 that is journaled transversely of the drive guide 51. In order that the means by which the pinion 88 is driven shall not be adversely affected by, or restrict, the independent axial translation of the drive guide 51, one end of the supporting shaft 89 may be connected to a drive shaft 90 (FIG. 2) by means of a universal joint 91. As an alternative means to actuate pinion 88 an independent power means may be secured to the side of the drive guide 51 and be movable therewith. In either event, the pinion may be rotated independently of the disposition of the drive guide 51 selectively to translate the racks 80 and 81 in opposite directions. As viewed in FIG. 5, clockwise rotation of the pinion 88 will tend to elevate rack 80 and simultaneously lower rack 81 to move the hubs 61 and 62 concurrently toward each other. Conversely, counterclockwise rotation of pinion 88 will tend to lower rack 80 and elevate rack 81 to move the hubs 61 and 62 concurrently away from each other.

The afore-described simultaneous axial movement of the hubs 61 and 62 also effects selective radial displacement of a plurality of bearing plates 95 disposed within the bladder 56. Each bearing plate 95 presents an outer surface 96 adapted to engage the bladder and conformingly compress it against the interior surface 97 of the uncured tile band without having a deleterious affect on either the bladder or the tire band. As can best be seen in FIG. 1, the surface 96 may be slightly arcuate.

The radially inner side of each bearing plate 95 is provided with a vertical rib 98 to which one end of an upper link arm 99 and one end of a lower link arm 100 can be pivotally secured. A suitable connection may be achieved by providing clevises 101 and 102 on the link arms 99 and 100, respectively, which embrace the rib 98 and are connected thereto by pivot pins 103 and 104, respectively.

The opposite end of the link arm 99 may also be provided with a clevis 105 to embrace and be pivotally secured, as by pivot pin 108, to a radial reinforcing rib 106 on the under side of the hub 62. Similarly, the opposite end of link arm 100 may also be provided with a clevis 109 to embrace and be pivotally secured, as by a pivot pin 111, to a lug 110 extending upwardly of the hub 61. A plurality of additional bearing plates 95 may be similarly mounted within the cavity defined by bladder 56. In fact, as will be more fully elucidated in conjunction with the explanation as to the operation of the subject center mechanism, a plurality of such bearing plates are required to assure the disposition thereof necessary to support the uncured tire band in spaced relation with respect to the mold sections and bead rings.

At least one dog-leg bend 112 is provided in each link arm in order to preclude an over-center lock even when the two hubs 61 and 62 are separated to the fullest extent possible. As shown, a dog-leg bend 112 between the main body portion 113 of each link arm and the clevis ends thereof quite satisfactorily achieve the desired result.

In order to emphasize the new and novel capabilities of the unique center mechanism heretofore described, a brief description of the operational steps typical to the embodiment disclosed will now be presented.

Figure 2:
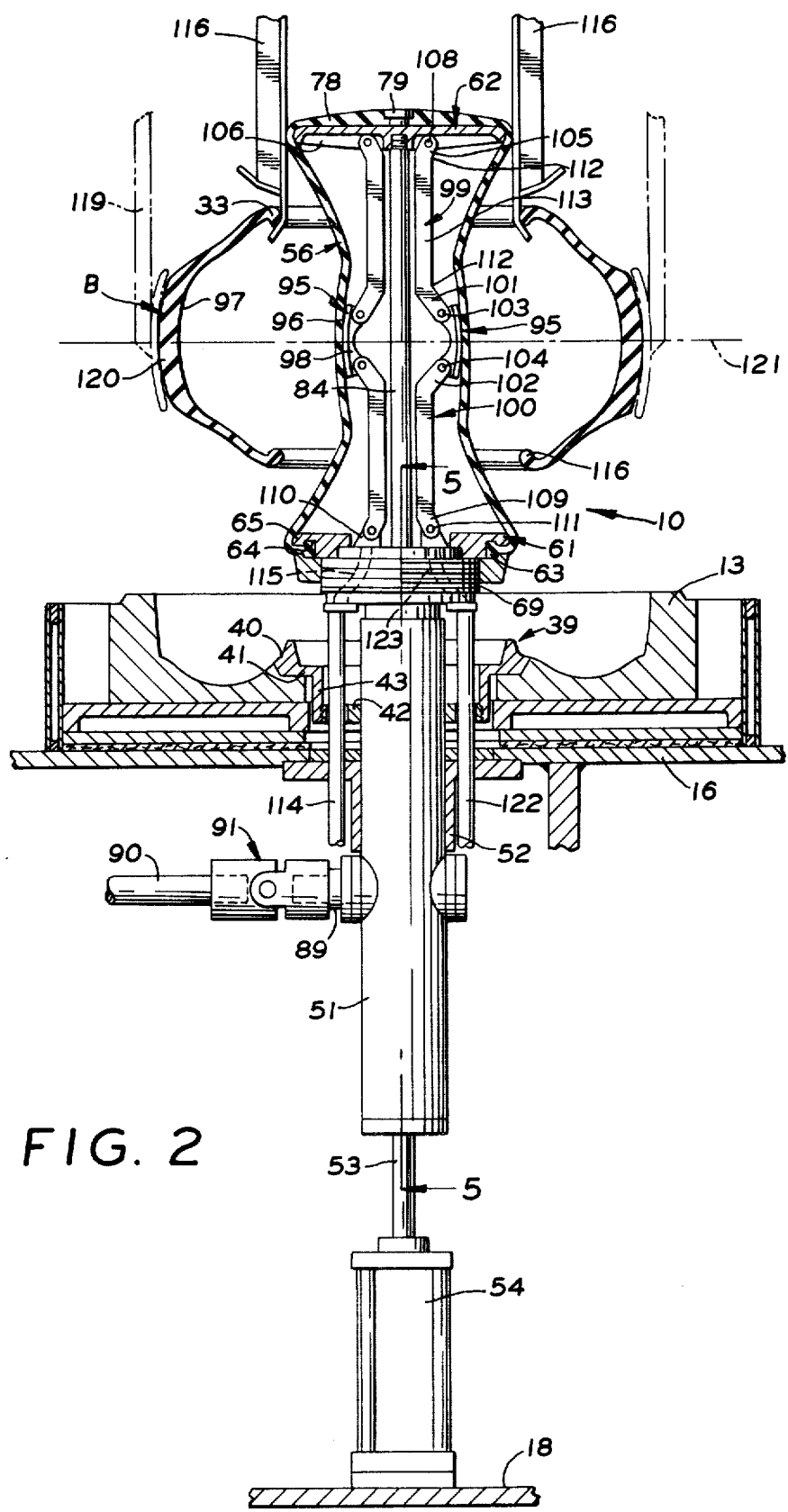
FIG. 2 is a fragmentary area of FIG. 1, also in section, depicting the center mechanism disposed to receive an uncured tire band thereover.

Referring particularly to FIGS. 2 and 5 we see the center mechanism 10 disposed to receive an uncured tile band (B). The drive shaft 90 has been rotated to turn the pinion 88 counteclockwise and separate the hubs 61 and 62 to the fullest possible extent. With the hubs 61 and 62 so disposed the main body portions 113 of the link arms 99 and 100 are substantially aligned and lie generally parallel to the connecting shaft 84. As the link arms are moved to this orientation the bearing plates are retracted to their radially innermost position, and the bladder 56 is axially extended. In addition, a subatmospheric pressure is applied to the interior of the bladder 56, as by a vacuum ejector (not shown) communicating with the interior of the bladder through conduit 114 connected to hub 61 and the passage 115 leading from the connection of conduit 114 through the body portion 66 of the hub 61. The bearing plates 95 offer a smooth support against which the medial portion of the bladder 56 can collapse. Even though relatively deep convolutions of the bladder may occur between the circumferentially spaced bearing plates, the convolutions are, because of the bearing plates, not as deep and not as likely to make wearing contact with the other components of the center mechanism. When the center mechanism is adapted to receive an uncured tire band it should be noted that the lower bead ring 39 is advantageously permitted to remain in its lowermost position within the lower mold section 13.

FIG. 2 also depicts the remainder of the center mechanism as having been raised independently of the lower bead ring 39 by cylinder 54 which acts on the cylindrical drive guide 51 through piston rod 53. While it is not fully necessary that the drive guide 51 be elevated merely to receive a tire, such elevation may be required — depending upon the configuration of the tire band — to maintain the lowermost bead forming portion 116 of the uncured tire band in spaced relation with respect to the retracted lower bead ring 39 when the bladder is subsequently inflated. Moreover, such elevation is normally incident to the removal of the previously cured tire, and the drive guide 51 may, therefore, conveniently remain in its raised position. It may also be desirable for some installations to coordinate the action of cylinder 54 with the action of the loader device properly to position the tire along the vertical extent of the extended bladder 56 — i.e., the cylinder 54 may serve as at least a component of a locator means.

In FIG. 2 two alternative forms of loader means are depicted. Paddle blades 116 are adapted to engage the uppermost bead forming portion 33 of the uncured tire band (B). As an alternative, paddle blades 119 may grasp the uncured tire band (B) exteriorly thereof, in the area of the tread forming portion 120. Irrespective of the particular loader means employed, however, it is obligatory that the uncured tire band (B) be located at a predetermined position along the center mechanism. When the uncured tire band (B) is properly located, the drive shaft 90 is rotated to turn pinion 88 clockwise and thereby move the hubs 61 and 62 into the closest possible proximity. This movement causes the link arms 99 and 100 to articulate about the various pivot pins 103, 104, 108 and 111 and displace the bearing plates 95 radially outwardly. This radial displacement of the bearing plates drives the medial portion of the bladder 56 into engagement with the inner surface 97 of the uncured tire band (B). The bearing plates thereby effect the application of mechanical pressure against the uncured tire band, and, because of the opposed disposition of the bearing plates, the pressure thus applied will support the tire in spaced relation upwardly of both the lower mold section 13 and the lower bead ring 39.

It must be appreciated that whereas the bearing plates are depicted as being diametrically opposed, the term "opposed" as used to define the location of the bearing plates is not intended to be so limited. Instead, "opposed" is intended to convey the connotation that the bearing plates are spaced circumferentially about the center mechanism such that when they are displaced radially outwardly to effect the application of pressure against the uncured tire band (B) they are disposed so as to support the tire band at the desired level and maintain it in concentricity with the center mechanism.

Figure 3:
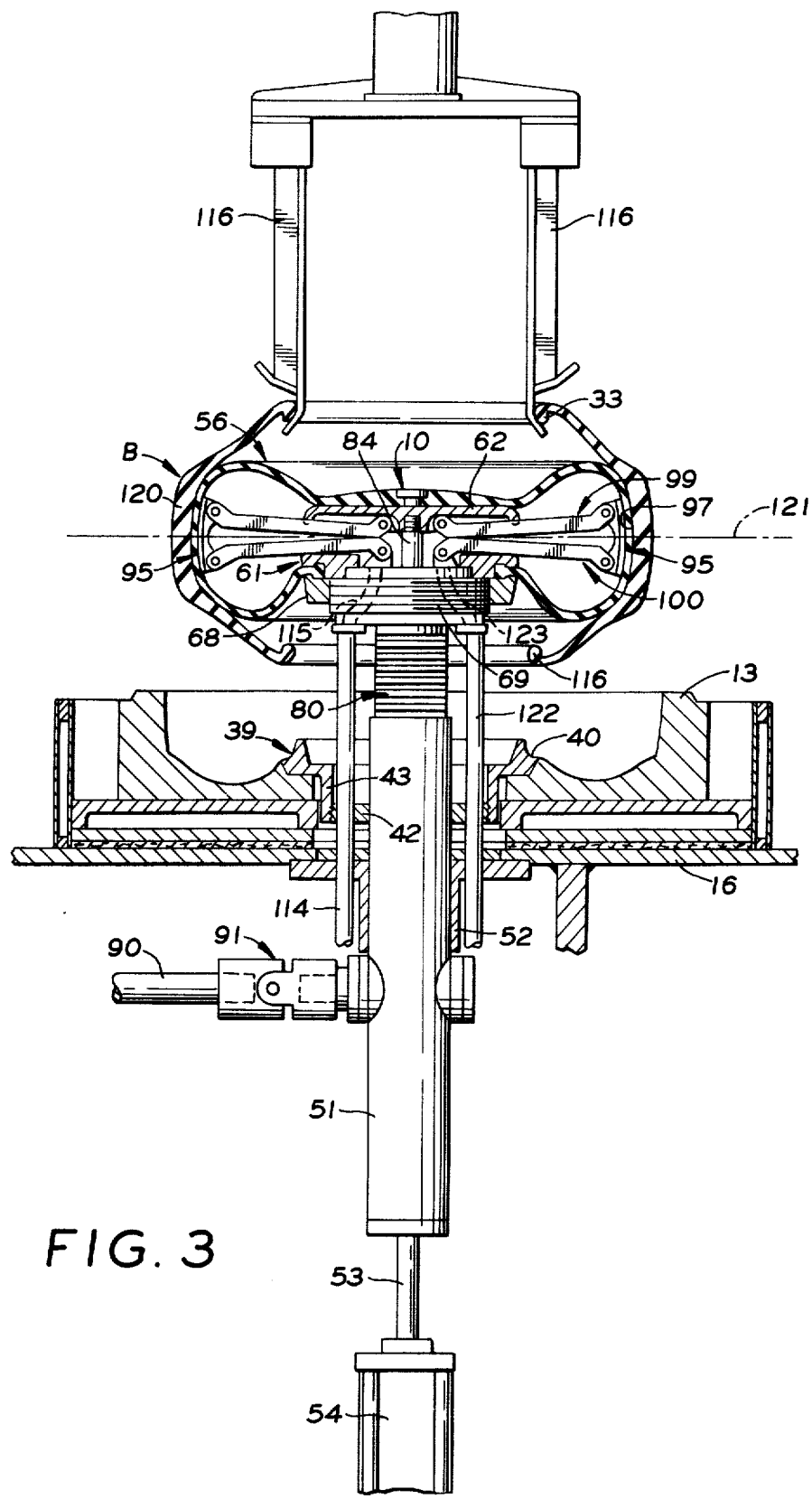
FIG. 3 is a view similar to FIG. 2 but representing the disposition of the center mechanism sequentially after the disposition depicted in FIG. 2 and with the bearing plates translated radially outwardly to drive the medial section of the bladder into firm engagement with the tire band at locations through which its plane of structural symmetry passes.

While the circumferential spacing of the bearing plates 95 need merely place them in opposition, the vertical disposition of the bearing plates with respect to the uncured tire band is far more critical. For subsequent bladder inflation to be properly effected the bearing plates must apply mechanical pressure against the uncured tire band at locations intercepted by its plane of structural symmetry 121, as shown in FIG. 3.

The application of mechanical pressure against the interior of the uncured tire band, effected as a result of the radially outward translation of the bearing plates 95, is sufficient to support the tire band (B), and the loader paddle blades 116 or 119 can thereafter be disengaged from the tire band and moved outwardly of the press in order to accommodate closing of the press in proper sequence.

The next step in the operation of the subject center mechanism is to inflate the bladder 56. The inflating medium may gain access to the interior of the bladder 56 by way of the conduit 122 connected to the body portion 66 of the hub 61 and the passage 123 through the hub 61 which allows communication between the conduit 122 and the interior of the bladder 56. Initial inflation is under relatively modest pressure, something on the order of five to twenty pounds per square inch for passenger tires. For tires larger than passenger tires this initial inflating pressure would be concomitantly higher. Because of the disposition of the medial portion of the bladder in contact with the tire band and because of the disposition of the end portions of the bladder in the relatively close juxtaposition effected by the proximity of hubs 61 and 62, the initial inflation of the bladder causes the bladder to contact the inner surface 97 of the tire band progressively in axially opposite directions from its transverse plane of structural symmetry 121. This progressive contact between the bladder and the tire band precludes the entrapment of air between the bladder and the tire band and also obviates the imposition of molding stresses in the tire band.

Figure 4:
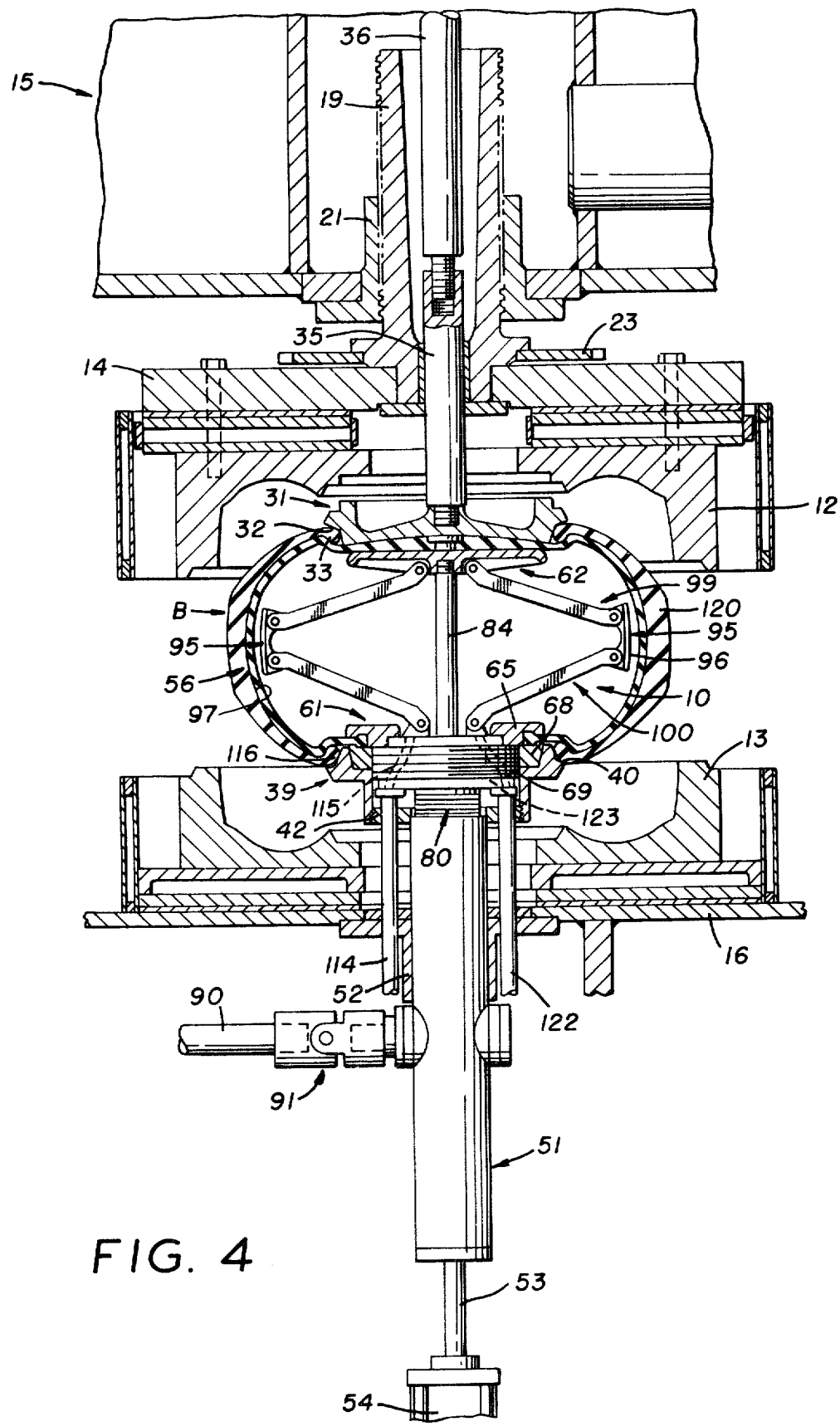
FIG. 4 is a view similar to FIG. 3 representing the disposition of the center mechanism sequentially after the disposition depicted in FIG. 3 and with the bladder inflated to support the tire band and with the bead rings engaging the bead forming portions of the tire band.

As can be seen in FIG. 4, even the relatively modest pressure applied by the initial inflation of the bladder will, as the bladder progressively engages the tire band, tend to force the hubs 61 and 62 apart so that the full interior surface 97 of the tire band will be engaged by the bladder 56. In addition, this movement of the hubs partially retracts the bearing plates which thereafter preferably remain out of contact with the bladder and apply no further pressure to the tire band. This release of contact is highly desirable in that: it allows unrestricted contact of the curing medium (usually steam) to the full surface of the bladder; it obviates the potential for any heat concentration that might result because of the heat conductivity of the particular material from which the bearing plates 95 are made; and, it assures that the bearing plates can in no way have any deleterious affect on the tire band as the mold closes thereabout. In order, therefore, that this desirable separation of the hubs be effected upon inflation of the bladder, some arrangement should be provided to accommodate counterrotation of the drive shaft 90, or an independent drive carried on drive guide 51 should one be employed, in response thereto, and this may well be accomplished by employng suitable clutch means (not shown) or by using worm gears, or the like, in the drive mechanism so that it can itself be readily driven by feedback forces.

In order to emphasize the versatility of the subject center mechanism, FIG. 4 demonstrates the feasibility of bringing both bead rings 31 and 39 into engaging contact with the bead forming portions 33 and 116, respectively, of the tire band (B) prior to the time that the molds actually close about the shaped tire band.

Quite diverse opinions are held by various tire manufacturers domestically and abroad as to the most judicious time during the shaping process that the bead rings should make contact with the tire band. Some manufacturers maintain that the tire band should be shaped by the cooperative efforts of the axial forces applied by the bead rings and the radial forces applied by the distending bladder. For the proponents of that technique the subject center mechanism can be cycled to bring the bead rings into contact with the tire band even prior to inflation of the bladder.

The antipodal approach is exemplified by those manufacturers who maintain either: that even the slightest possibility for restriction — such as that incident to contact of the bead rings with the tire band — to the adjustment and reorientation of the various components within the tire band as it is being shaped to its toroidal form should be obviated; or, that separation of the bead rings from their corresponding mold sections for a period of time longer than that required to strip the cured tire from a mold section unnecessarily cools the bead rings and slows the subsequent curing cycle. For the proponents of these approaches the bead rings in the subject center mechanism can well be retained within their respective molds during the entire shaping operation. In fact, those who do not wish to employ the bead rings during the preliminary shaping operation may find it desirable to eliminate the means for moving the upper bead ring 31 independently of the upper mold section 12 and affix that bead ring permanently to the mold section (in the type press depicted movement of the lower bead ring 39 with respect to the lower mold section 13 is generally employed to strip the cured tire from the lower mold section).

It should, therefore, now be apparent that a center mechanism according to the concept of the present invention can accommodate either diametrically opposed schools of thought as to when the bead rings should first contact the uncured tire band as well as any desired compromise therebetween.

Irrespective of when one elects to bring the bead rings into contact with the tire band, the mold sections may be closed about the tire band when it is in the configuration substantially represented in FIG. 4. After the mole is closed the bladder may be inflated to full curing pressure, and this pressure forces the tire band into intimate contact with the mold sections. As such, a press shaping the subject center mechanism may utilize a standard two-piece mold even with partially preshaped tire bands. However, one may, if desired, certainly employ segmented molds, and the subject center mechanism assures concentricity of the uncured tire band with the sidewall mold plates thereof throughout the shaping process so that as the segment plates of such a mold move into final position they do not alter the previous disposition of the shaped tire band.

It should be emphasized that once a tire is supported by the subject center mechanism the sequential steps necessary to shape the tire can be fairly rapidly accomplished. As such, the time during which the press must be open to accommodate shaping of the tire band is minimized, as is the time during which the unshaped tire band is contacted by elements of the press (such as the bladder) still hot from the previous curing cycle. Moreover, because the subject center mechanism affords symmetrical insertion as well as symmetrical inflation of the bladder, degradation of the sidewalls or bead portions of even single ply tires is precluded. It should also be appreciated that by symmetrically inflating the bladder the dimensional tolerances thereof need not be critical, and, in fact, a number of tire sizes can well be cured on a common bladder size.

In view of the foregoing disclosure it should be apparent that center mechanisms embodying the concepts of the present invention possess a universality which permits them to accomplish the objects thereof.

What is claimed is:

1. In a press for shaping and curing tires, a center mechanism comprising, a flexible bladder over which an uncured tire band having a transverse plane of structural symmetry is receivable, opposed axially movable hubs with said bladder secured thereto, opposed bearing plates disposed within said bladder, link arms connecting said bearing plates to said hubs for displacing said bearing plates radially outwardly upon axial movement of said hubs toward each other to effect the application of mechanical pressure against the uncured tire band and thereby support it in a predetermined position with respect to said bladder, means for conforming said bladder to the uncured tire band and for subsequently disengaging said opposed bearing plates from against said bladder to allow unrestricted contact of the curing medium to the full surface of said bladder.

2. In a press, as set forth in claim 1, a loading mechanism, said loading mechanism comprising, paddle means to grasp the uncured tire band and position the uncured tire band grasped thereby concentrically of the center mechanism.

3. A loading mechanism for a press, as set forth in claim 2, further comprising, locating means to correlate the relative disposition of the paddle means and center mechanism such that said bearing plates cause the bladder to engage the uncured tire band at locations intercepted by its transverse plane of structural symmetry.

4. A center mechanism for a press, as set forth in claim 1, further comprising drive means simultaneously to move said opposed hubs.

5. A center mechanism for a press, as set forth in claim 4, in which said drive means further comprises an individual rack means secured to each said hub and a common pinion simultaneously to drive said rack means in opposite directions.

6. A center mechanism for a press, as set forth in claim 4, further comprising means to support said bladder from at least one said hub.

7. A center mechanism for a press, as set forth in claim 4, further comprising means to inflate said bladder within said uncured tire band such that the bladder contacts the tire band progressively in axially opposite directions from said transverse plane of structural symmetry.

8. A center mechanism for a press, as set forth in claim 7, further comprising at least a lower bead ring and means to move said bead ring independently of said hubs.

9. A center mechanism for a press, as set forth in claim 7, further comprising upper and lower bead rings and means to move said bead rings toward and away from each other independently of said hubs.

10. A center mechanism for a press, as set forth in claim 7, further comprising means axially to translate said center mechanism independently of said bead ring.

11. A center mechanism for a press, as set forth in claim 1, in which each said link arm further comprises a dogleg bend whereby to preclude over-center locking.

* * * * *